UNITED STATES PATENT OFFICE.

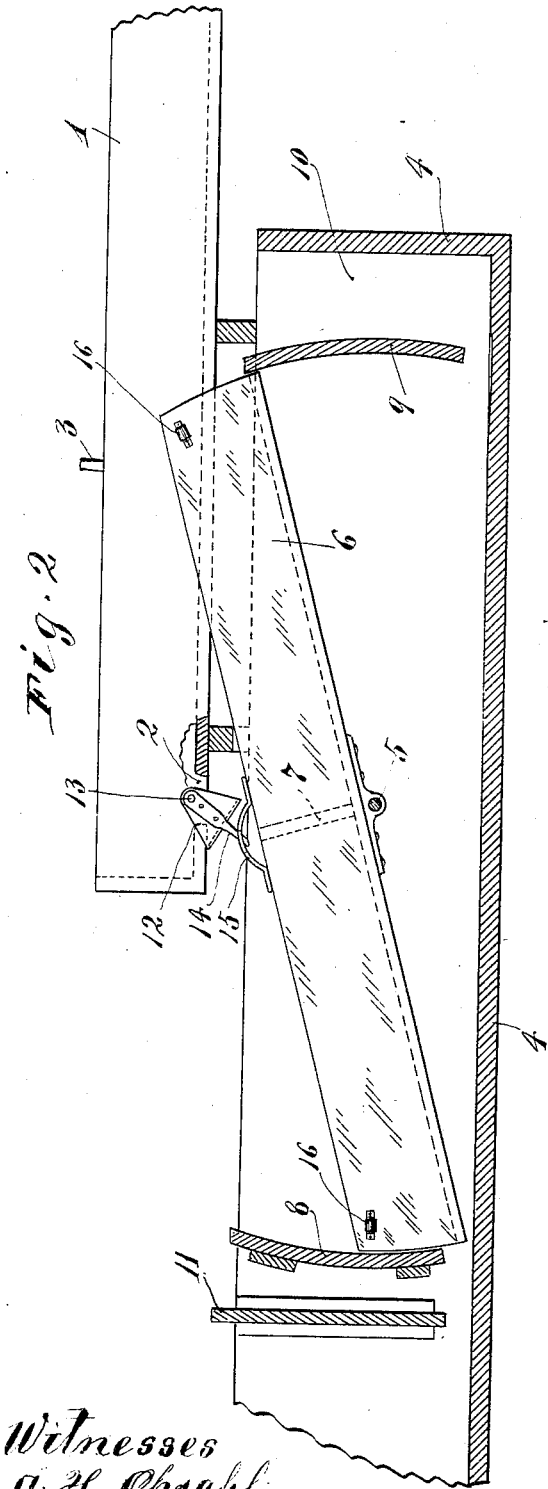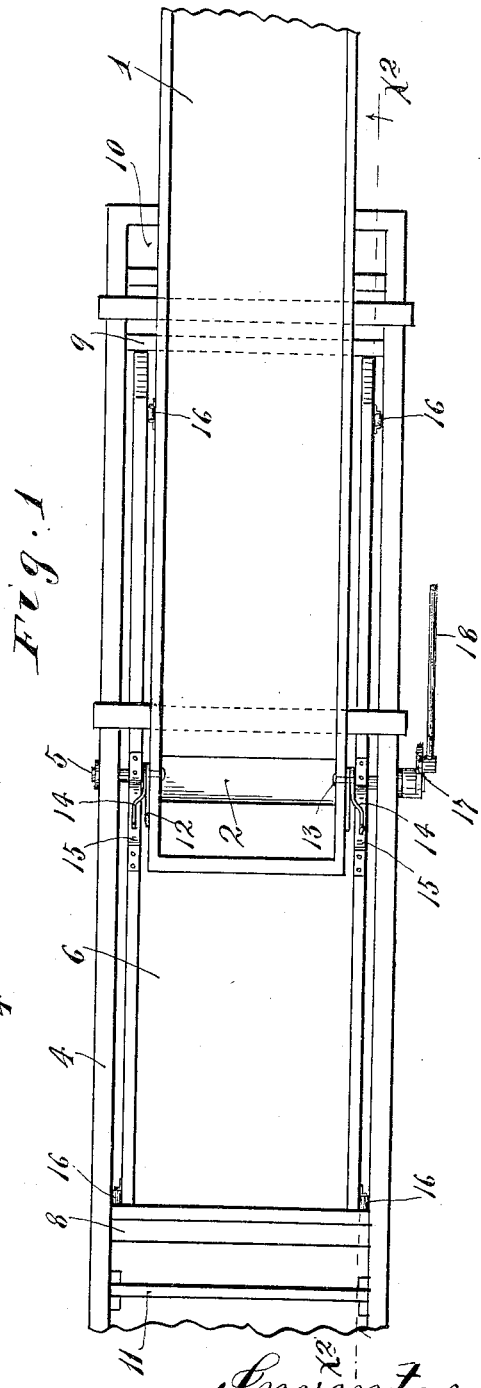

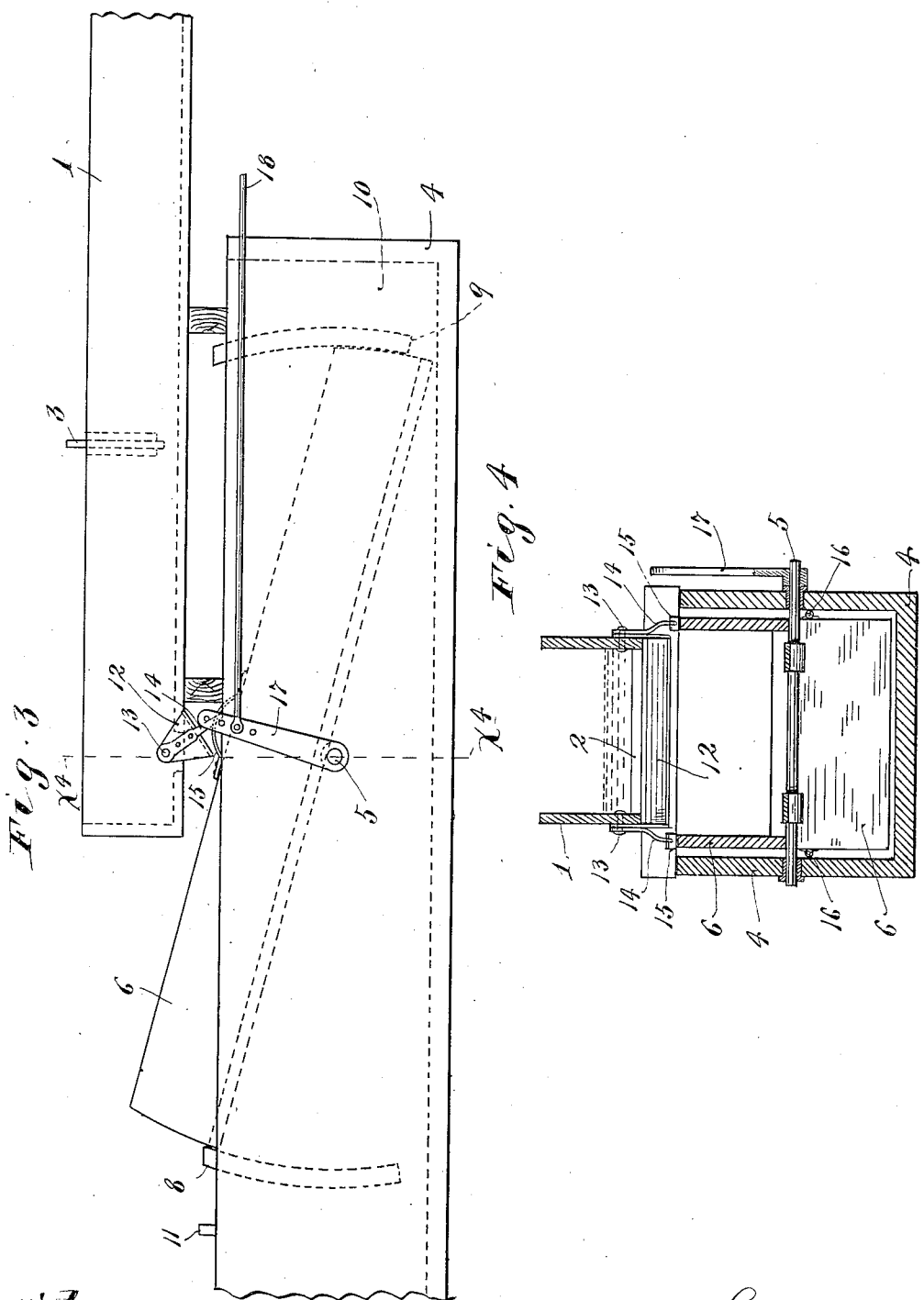

FREDERICK W. JOHNSON, OF EXCELSIOR, MINNESOTA.

WATER-MOTOR.

931,875.  Specification of Letters Patent.  Patented Aug. 24, 1909.

Application filed February 23, 1909. Serial No. 479,307.

*To all whom it may concern:*

Be it known that I, FREDERICK W. JOHNSON, a citizen of the United States, residing at Excelsior, in the county of Hennepin and State of Minnesota, have invented certain new and useful Improvements in Water-Motors; and I do hereby declare the following to be a full, clear, and exact description of the invention, such as will enable others skilled in the art to which it appertains to make and use the same.

My invention has for its object to provide an improved water motor or power device adapted to be operated by a stream of running water, and to this end, it consists of the novel devices and combinations of devices hereinafter described and defined in the claims.

The invention is illustrated in the accompanying drawings wherein like characters indicate like parts throughout the several views.

Referring to the drawings: Figure 1 is a plan view, showing the improved device; Fig. 2 is a view, partly in side elevation, and partly in vertical section, taken on the line $x^2\ x^2$ of Fig. 1; Fig. 3 is a side elevation of the said device; and Fig. 4 is a transverse vertical section taken on the line $x^4\ x^4$ of Fig. 3.

The water which actuates the motor is, as shown, delivered thereto by a sluice trough 1, having at its delivery end a discharge passage 2, that opens downward through the bottom thereof. In the sluice 1, is a vertically adjustable gate 3, by means of which, the amount of the current flow may be regulated. Located below the sluice 1 is a receiving sluice 4, which, as shown, is also in the form of a trough, and which extends under the former to a point considerably back of its discharge passage 2. A transverse rock shaft 5 is journaled in suitable bearings on the sides of the sluice 4, and is located directly below the discharge passage 2 of the sluice 1. To the rock shaft 5, a long oscillatory sluice box 6 is rigidly secured in its central or intermediate portion. The ends of this sluice box are open, and the box is provided at its central portion with a dividing rib or partition 7. The open ends of the box 6 work without friction; but in close engagement with the inner surfaces of the curved baffle plates 8 and 9. These baffle plates 8 and 9, at their lower edges, terminate considerably above the bottom of the sluice 4. The plate 9 is spaced from the end plate or head of the sluice, so as to form a water accumulation chamber 10. A vertically adjustable gate 11 is mounted in suitable guides located below and spaced apart from the lower baffle plate 8. Both of the baffle plates 8 and 9 are made vertically adjustable, so as to vary the time of escape of the water from the sluice box, or to otherwise properly set the device so that it will produce different power of utilization of more or less of the current of a river or other stream.

A deflecting plate 12 is arranged to vibrate below the discharge passage 2 of the upper sluice 1, and as shown, this is provided with up-turned end portions that embrace the sides of the said sluice 1, and are pivotally connected thereto at 13. At its ends, the said deflecting plates 12 are provided with depending fingers 14, that work in the perforations of arch plates 15 rigidly secured to the sides of the intermediate portion of the oscillatory sluice box 6. This arrangement is such that when the sluice box is in the position shown in Fig. 2, the deflecting plate 12 will direct the water discharge from the passage 2, into the rear compartment of the said sluice box; but when the said sluice box is in the position shown in Fig. 3, said deflecting plate 12 will deflect the water into the down stream compartment of the said sluice box. Otherwise stated, this deflecting plate, by movements of the oscillatory sluice box 6, will be oscillated from one extreme position into the other, and will always be set to deliver the water into the raised compartment of the said sluice box.

On its sides, the sluice box 6 is preferably provided with rollers 16 that are adapted to engage the inner surfaces of the vertical walls of the lower sluice and thereby prevent spreading of the free end side portions of the said sluice box, and at the same time preventing much friction between the said sluice box and lower sluice.

At one end, the rock shaft 5 is shown as provided with an arm 17 to which the crank rod 18 is attached for the purpose of transmitting motion from the oscillatory sluice box to any machine or mechanism which is to be driven thereby. It will, of course, be understood, that any suitable kind of power transmission mechanism may be used to transmit power from the said oscillatory sluice box.

The operation of the device is substantially as follows: When the sluice box is in the position shown in Fig. 2, the water will, as before stated, be delivered into the upstream compartment thereof, to-wit, into the right hand compartment as shown in said view, and when the weight of the accumulated water is sufficient to overcome the resistance of the mechanism which is driven therefrom, this right hand end of the said sluice box will be forced downward and the sluice box will then assume the position shown in Fig. 3. The water discharged by this downward movement of the right hand end of the sluice box will run chiefly into the compartment 10, but some thereof will escape and run downward into the lower sluice 4. The water will then be directed by the deflecting plate 12 into the left hand or down-stream compartment of the sluice box, and when it has sufficiently accumulated therein, the said sluice box will be forced back into the position shown in Fig. 2. While this is taking place, however, most of the water will escape from the accumulation chamber or compartment 10, and will run downward into the sluice 4. The accumulation of water in the chamber 10 and the escape thereof, will take place in part while the sluice box 6 is making its oscillatory movements, and this escaping water will afford a cushion which will prevent the downwardly moving end of the sluice box from striking a hard blow on the bottom of the sluice. In the manner above described, it is evident, that under the flow of the stream of water acting thereon, the sluice box so-called, will be kept under substantially an even oscillatory movement.

The device may, of course, be made of any desired size. It is especially adapted for use in connection with a running stream in the vicinity of rapids, falls or a dam, but it may be installed in a stream having but very little incline, in which case, of course, the upper sluice would have to be run a proper distance up-stream to obtain the necessary head or fall of water from the one sluice box to the other at the place where the water is delivered into the so-called oscillatory sluice box. When made in large dimensions, the sluices will be preferably made of concrete reinforced with steel, and the sluice box should preferably be of steel. The bottom of the receiving end of the lower sluice should be preferably set at the high water line of the stream, so that it would remain in operation under all conditions of the water.

The rapidity of operation of the sluice box may be controlled to a large extent, by adjustments of the gate 3 of the upper sluice, and the gate 11 in the lower sluice, should be correspondingly adjusted so as to hold back enough of the water to afford a cushion to the downwardly moving ends of the oscillatory sluice box.

What I claim is:

1. In a device of the kind described, the combination with an upper sluice and a lower sluice, of an intermediately pivoted oscillatory sluice box having an intermediate partition and open ends, said lower sluice having curved baffle plates curved on lines concentric to the axis of the pivot of the oscillatory sluice box closely engaging and coöperating with the open ends of said oscillatory sluice box, and provided with discharge passages at their lower edges, substantially as described.

2. In a device of the kind described, the combination with an upper sluice and a lower sluice, of an intermediately pivoted sluice box having a central partition and open ends, curved baffle plates in said lower sluice coöperating with the open ends of said sluice box, and terminating above the bottom of said sluice, said lower sluice having an accumulation chamber in its up-stream end beyond the uppermost of said curved baffle plates, and a vibratory deflecting plate arranged to deliver water from said upper sluice always into the raised compartment of said sluice box, substantially as described.

3. In a device of the kind described, the combination with an upper sluice and a lower sluice, the former having a discharge passage in the bottom of its delivery end overlying the receiving end of said lower sluice, an oscillatory sluice box intermediately mounted on a pivot, located in said lower sluice below the discharge passage of said upper sluice, said sluice box having a central partition and open ends, a pivoted deflecting plate connected to and operated by said sluice box, and arranged to deliver the water always into the raised compartment of said sluice box, curved baffle plates in said lower sluice coöperating with the open ends of said sluice box and terminating above the bottom of said lower sluice, said lower sluice having an accumulation chamber in its up-stream end, and adjustable gates one located in said upper sluice above the discharge passage thereof, and the other located in said lower sluice below the lower baffle plate, substantially as described.

In testimony whereof I affix my signature in presence of two witnesses.

FREDERICK W. JOHNSON.

Witnesses:
ALICE V. SWANSON,
HARRY D. KILGORE.